United States Patent Office 3,440,071
Patented Apr. 22, 1969

3,440,071
PLYWOOD ADHESIVE AND PROCESS
OF FORMING SAME
John Thomas Stephan, 1318 W. Kessler,
Longview, Wash. 98632
No Drawing. Filed Nov. 30, 1966, Ser. No. 597,895
Int. Cl. C09h 11/00; B32b 21/14
U.S. Cl. 106—154                                    22 Claims

ABSTRACT OF THE DISCLOSURE

Insoluble fertilizer grade blood rendered in a form usable as a plywood adhesive constituent by combining thereof in aqueous slurry with seed stock selected from the group consisting of whole legume seeds, safflower seeds, oil seed residues, and mixtures thereof, the blood-seed slurry being hydrated and reduced in particle size by hydro-pulping the slurry with multiple passes thereof through a mechanical grinding apparatus, after which the hydrated product is combinable with hydrated lime or like alkaline earth hydroxide, with caustic soda or like alkali metal hydroxide, and with an alkali metal salt capable of undergoing a double decomposition reaction with the alkaline earth metal hydroxide, such as sodium silicate, to produce a plywood adhesive having good spreadability on commercial double roll glue spreaders and excellent bonding characteristics when utilized as either a cold press or hot press plywood adhesive.

FIELD TO WHICH THE INVENTION PERTAINS

The invention pertains to the art of hydrating and effecting a reduction in particle size of a mixture of unground fertilizer grade blood and oil seed residues or like seed stock by multiple-pass grinding of an aqueous slurry of the mixture in a wet mechanical grinder to the hydrated finely ground product thereby formed, to the preparation of plywood type adhesives from such hydrated finely ground product by addition of alkaline reactants, with or without conjunctive addition of defoamers, and aqueous thermosetting resins, and to adhesive compositions thus formed.

DESCRIPTION OF THE PRIOR ART

Insoluble fertilizer grade blood meal is made by drying the whole blood obtained from slaughtered cattle, sheep and pigs at temperatures 212° F. and above in a well stirred evaporative dryer, whereby the blood is heat, coagulated or gelled and then progressively dried to a moisture content of from about 0% to 30%. A suitable dryer is a ribbon mixer equipped with a jacket heated with steam at 25 p.s.i. gauge. It is customary to include a few large animal bones in the dryer along with the blood. The banging around of these bones dislodges any blood material which dries and adheres to the metal sides or stirrer of the dryer. The product from this drying operation is a dirty brown-red color having a typical packing house odor, a moisture content usually about 5 to 15%, and a particle size distribution about as follows:

| Retained on— | Percent |
|---|---|
| 80 mesh screen | 42.7 |
| 100 mesh screen | 10.6 |
| 150 mesh screen | 7.3 |
| 200 mesh screen | 24.3 |
| 325 mesh screen | 14.4 |
| Through 325 mesh screen | 0.7 |

This product is further characterized by being insoluble in hot (212° F.) water or room temperature (70° F.) water. Such product exhibits a varying ability to swell in sodium hydroxide solution, which depends on the extent of the heat treatment given it before drying, during the drying period, and after drying. Blood which is dried substantially in the foregoing manner is too insoluble to be edible and consequently is used largely for fertilizer purposes, from whence it gets its name fertilizer grade blood, or simply fertilizer blood.

Such fertilizer blood is available in large quantities at fertilizer nitrogen prices. Several attempts have been made to utilize this material in plywood adhesives; see U.S. Patent Nos. 2,292,674, 2,400,541, 2,391,387, 1,925,232. The product of commerce available from slaughter houses such as Armour & Co., Chicago, Ill., Swift & Co., Chicago, Ill., known as fertilizer blood, and having a particle size distribution as recorded previously, is too coarse and too insoluble to make a satisfactory plywood adhesive with calcium hydroxide, sodium hydroxide, and sodium silicate. No adhesive of this coarse type has ever found commercial acceptance due to the fact that such a composition has poor spreadability, being incapable of spreading on commercial double roll glue spreaders and poor penetration of the adhesive into the veneer with resulting poor bond. In order to utilize fertilizer blood with these glue chemicals it has been necessary to hammermill or otherwise dry grind the dry fertilizer blood to a fine mesh, circa through 200 to 325 mesh, prior to mixing water and chemicals in a wet glue mixing operation.

Heretofore it has been necessary to combine insoluble fertilizer blood with water soluble blood albumen to make an adhesive suitable for bonding wood veneers. Such a process is disclosed by Fawthrop in U.S. Patent No. 2,292,624. Fawthrop grinds the refractory fertilizer blood in the dry state so that all of it passes through a 100 mesh screen and 80% passes through a 200 mesh screen, and then combines this with dry powdered soluble blood albumen, water and alkaline chemicals to make an adhesive as shown in his Example 1. The high cost of dry grinding the refractory fertilizer blood and the cost of soluble blood were disadvantages in the commercial utilization of this formula, so that its use was short lived.

SUMMARY OF THE INVENTION

This invention relates to improved protein containing plywood adhesives wherein seed stock is combined with insoluble fertilizer grade blood and water and hydrated by fine grinding while suspended in an aqueous medium to give an aqueous glue base, which is then treated with certain glue chemicals and by additional stirring is converted to a new efficient plywood adhesive suitable for use in both the hot press method and cold press method of making plywood.

The seed stock and fertilizer grade blood, when hydrated by find grinding, may be combined with various chemicals, such as an alkaline earth hydroxide, an alkali metal hydroxide, and an alkali metal salt capable of undergoing a double decomposition reaction with an alkaline earth hydroxide in the presence of the hydrated protein to give a colloidally dispersed insoluble alkaline earth salt, and with aqueous thermosetting resin such as the common aqueous alkaline phenolic type disclosed in U.S. Patent No. 2,360,376 to give a plywood adhesive with improved flow properties and fast setting time in the hot press.

The protein containing seed stock contemplated by the present invention is selected from the group consisting of: (1) the unground residues remaining after the extraction of the naturally occurring oil from the oil seeds of commerce, such as soybeans, cottonseeds, peanuts, flaxseed, safflower seed, tung nuts, and the like; (2) whole undecorticated legume seeds such as field peas, red beans, pinto beans, lima beans, and soybeans; and (3) safflower seeds; and (4) mixtures thereof. Such seed stock is advantageously used with fertilizer grade blood and, after hydro-pulping, give new and useful materials reactive with resins and other adhesive forming chemicals to give improved thermosetting adhesives suitable for bonding plywood.

As will be understood, the product of the whole undecorticated seed differs from the commercially available extracted oil seed residues, since the latter are of higher protein content in that they do not contain the low protein, high hemi-cellulosic and cellulose containing surface layer of the seed hull.

In contrast to the process of Fawthrop, I have found that insoluble fertilizer grade blood can be economically hydrated and reduced in particle size by combining it with an oil seed residue in aqueous slurry and hydropulping this slurry by multiple passes through a mechanical grinding apparatus, after which hydration step the hydrated product can be combined with hydrated lime, caustic soda, and a sodium silicate to give a plywood adhesive of excellent quality.

Unfortunately fertilizer blood does not grind very easily. The particles are extremely abrasive and resistant to size reduction. As a result, the cost of grinding is high due to low yield and high abrasion loss of hammer milling.

I have found that insoluble fertilizer blood may be simultaneously hydrated and reduced in particle size by multiple-pass wet grinding in a suitable mechanical mill such as a double disc attrition mill in a process analogous to the hydration of cellulose pulp in a beater or Jordan refiner. Such hydrated fertilizer blood can advantageously be used together with hydrated soybean flakes and glue chemicals to make an excellent hot press or cold press plywood adhesive.

DESCRIPTION OF PREFERRED EMBODIMENTS

The operation of my process is not dependent on the use of a particular type of grinding equipment. A wide variety of hydropulpers may be used. Suitable wet grinding equipments are the pulp beater, the Jordan refiner, the double disc attrition mill, the hammermill, the vibrating ball mill, the rod mill, and the like.

A pulp beater (which has evolved into an efficient means for hydrating cellulose pulps) may be used; however, it is awkward in both size and shape and is generally available in such large capacity models as would present a problem in using such equipment in a plywood mill of ordinary size; and I prefer to use wet grinding equipment, such as a double disc attrition mill, which is available in smaller capacities and is more suitable to adhesive production.

Typically, a suitable such mill is a 30 horespower Sprout-Waldron double disc attrition mill having double discs, 24 inches in diameter, rotating in opposite directions at motor speed of 1740 r.p.m., equipped with grinding plates having a waffle-like pattern, and with main radial grinding elements $\frac{1}{8}''$ wide and running continuously about 6 inches along a radius. These radial grinding elements intersect the periphery and are spaced about $\frac{1}{2}$ inch apart. Concentric rings spaced about $\frac{3}{4}$ inch apart form the closed pockets of the waffle pattern. These pockets are $\frac{1}{4}$ inch deep, and set to zero between the plates. In this equipment, a slurry consisting of 100 pounds soybean flakes and 400 pounds water at 70° F. will grind at the rate of 106 pounds of slurry per minute. The grinding discs are spring loaded and thus allow the plates to back off slightly when grinding.

For some applications, once through or one-pass grinding is sufficient. However, for most plywood applications as many as twelve passes through the same grinder, as just described, are desirable to achieve the degree of hydration for best use in producing an adhesive suitable for the manufacture of Douglas Fir plywood meeting the requirements for interior grade plywood as specified by the American Plywood Association. Such hydration may be achieved by allowing the slurry to be processed to pass continuously through twelve similar double-disc attrition mills. Or, alternatively, the slurry can be pumped from the product side of the attrition mill around to the feed side of the attrition mill in closed circuit grinding and the operation continued batchwise for five minutes or so to achieve the same degree of hydration and size reduction as by the continuous process through twelve similar double disc mills. Multiple passes through the wet attrition mill or the equivalent in closed circuit wet grinding is necessary for the best results.

In some instances it is desirable to combine a preliminary hydration and size reduction on a wet attrition mill and follow with a pass through a wet stone burr mill set at close tolerances.

A distinct advantage of my process is that a wide variety of feedstocks can be utilized and it is not necessary that residues from oil extraction processes be used, for instance, new whole field peas may be used without any oil extraction step.

An important element of my invention is that I have found that a satisfactory hydration and size reduction of insoluble fertilizer grade blood can readily be accomplished simultaneously with the hydration and size reduction of the seed stock, which acts as a carrier for the more refractory insoluble fertilizer blood. I have found that extracted soybean flakes, for example, will stay suspended when initially suspended in water having a temperature of about 50° F., in the ratio of 100 pounds of flakes to 500 pounds of water, whereas fertilizer grade blood will not stay suspended by itself. An initial mixture of fertilizer grade blood and water settles out rapidly, the fertilizer grade blood forming an unhydrated layer on the bottom of the container. A mixture of fertilizer grade blood and water by itself does not hydrate nor undergo ready size reduction when passed through a grinding mill. However, if the highly refractive insoluble fertilizer grade blood is suspended in an aqueous mixture of seed stock such as soybean flakes and water, then it is possible to hydrate and simultaneously effect a reduction in particle size of both the fertilizer blood and the soybean flakes by closed circuit grinding in a suitable mill such as a double disc attrition mill. Any analysis as to the physical reasons why insoluble fertilizer blood may be ground in the presence of a relatively coarse seed meal residue is necessarily speculative, however, I believe that the highly refractive insoluble fertilizer blood particles separate from the water and a cluster of these semi-dry particles act as a bridge between the grinding plates holding them apart while the bulk of the fertilizer blood passes through untouched. When a mixture of fertilizer blood, seed stock, and water are passed through a wet attrition mill, the individual particles of insoluble fertilizer blood are trapped between the water swollen particles of the seed stock and thus do not agglomerate and cut down the mechanical action, hence hydration and particle size reduction occurs producing a useful commercial and economic adhesive base.

In carrying out the hydration and particle size reduction of insoluble fertilizer blood and seed stock, it is extremely important to limit the formation of foam in the finished product. Multiple passes through a mechanical grinder or beater naturally give rise to air entrainment and it is easy to produce a low-specific gravity product containing entrapped air. As a rule of thumb, it is undesirable to have a wet mix adhesive of specific gravity less than about 1.00 if the adhesive is to be spread on the conventional double roll glue spreaders at roll peripheral speeds of 250 feet per minute.

While in some cases it may not be necessary, I have found that it is usually desirable to include suitable antifoamers in the initial water mixture of insoluble fertilizer blood and oil seed residue. Suitable antifoamers are water insoluble and selected from the group consisting of alpha-terpineol containing materials such as pine oil, alcohols having five or more carbon atoms per molecule, terminal hydroxyl containing reaction products of propylene oxide and/or butylene oxide, alkanol tertiary esters of phosphoric acid such as tri-butyl-phosphate, and the like. Usually the anti-foam material needs to be present in an amount not more than about 2% based on the total dry weight of the material undergoing hydration and reduction in particle size by mechanical action. There is no lower limit, since under certain circumstances no anti-foam need be used. This is the case when higher ratios of insoluble fertilizer blood to seed stock are used and slower speeds are used in the mechanical beaters or grinders.

I prefer to use ordinary commercial hydrated lime, which is substantially calcium hydroxide, however, hydrated lime made from a dolomitic limestone is equally effective and contains an appreciable quantity of magnesium hydroxide. Other equivalents to the hydrated lime are magnesium hydroxide, barium hydroxide, and strontium hydroxide, i.e. commercially available alkaline earth hydroxides.

Potassium and lithium hydroxide are equivalents for the sodium hydroxide in my process. Such compounds are generally known as alkali metal hydroxides.

Suitable silicates are all commercially available ratios of silicon dioxide to alkali metal oxide, from 1:1 to 4:1. These may be dry powders or aqueous solutions. A preferred silicate material is a 29.4% solids aqueous solution of sodium silicate having a ratio of 1 mol of sodium oxide to 3.22 mols of silicon dioxide. Potassium silicates are equivalent to sodium silicate in practice of the invention.

Water soluble or dispersible reaction products of a phenol body, such as phenol, cresol, xylenol, and the like with an aliphatic aldehyde such as formaldehyde or acetaldehyde, are useful addition agents to the basic wet adhesive mixture of my invention and impart valuable properties such as a higher degree of water resistance in plywood made with such adhesives. Additional resistance to glue line attack by micro-organisms is also conferred to the adhesive product. Such water soluble or water dispersible reaction products can be alkali-metal salts of the phenol aldehyde reaction products. Highly satisfactory phenol-aldehyde condensation products are those defined in the Van Epps U.S. Patent No. 2,360,376 and Stephan et al. U.S. Patent No. 2,437,981.

Water soluble reaction products of a ketone, such as acetone, methyl-ethyl-ketone, and the like, with formaldehyde and, also, three component resins containing amines, in addition to the ketone and aldehyde elements, are useful additions to the basic wet adhesive mixture of my invention and impart valuable properties such as improved working life, higher degree of water resistance in the plywood bond, and additional resistance to decomposition by micro-organisms. Amines of interest in three component resins are di-methylamine, mono-methyl-amine, tri-ethanol-amine, di-ethylene triamine, tri-ethylene-tetra-amine, ethylene diamine, and the like. Usually from about 2% to about 20% by weight of these reaction products based on the dry weight of the organic material in my glue base upgrades the adhesives of the present invention. Greater amounts may be used as dictated by economics.

Example 1

An adhesive base typifying the invention was prepared, as follows:

20# of soybean flakes, with 44% protein and having the following sieve analysis:

| On— | Percent |
|---|---|
| 14 mesh screen | 12.4 |
| 20 mesh screen | 18.0 |
| 24 mesh screen | 14.8 |
| 32 mesh screen | 26.0 |
| 48 mesh screen | 16.0 |
| 60 mesh screen | 2.6 |
| 80 mesh screen | 2.5 |
| 100 mesh screen | 1.5 |
| 150 mesh screen | 1.4 |
| 200 mesh screen | 1.1 |
| 325 mesh screen | 1.3 |
| Thru 325 mesh screen | 2.4 |

5.0# of fertilizer blood, insoluble in water at 70° F. and having a sieve analysis as follows:

| On— | Percent |
|---|---|
| 14 mesh screen | 8.6 |
| 20 mesh screen | 13.0 |
| 24 mesh screen | 5.5 |
| 32 mesh screen | 13.0 |
| 48 mesh screen | 15.3 |
| 60 mesh screen | 3.4 |
| 80 mesh screen | 8.6 |
| 100 mesh screen | 9.9 |
| 150 mesh screen | 5.5 |
| 200 mesh screen | 7.0 |
| 325 mesh screen | 8.9 |
| Thru 325 mesh screen | 1.3 |

100# water at 60° F., and 0.5# polypropylene glycol having a molecular weight of 4000.

The above ingredients were slurried together in a single action mixer, and then pumped at the rate of 12 gallons per minute to the intake of a 15 H.P. Sprout-Waldron double disc attrition mill (as above described) with its grinding plates set at substantially zero clearance. Operation of this mill involves rotation of each successive plate in an opposite direction at 1740 r.p.m. The ground product was collected and rerun a total of five times. Samples were withdrawn after grinding periods of 1 min., 3 min., and 5 min., for sieve analysis with the following results:

| Sieve analysis | Closed circuit grinding time, percent | | |
|---|---|---|---|
|  | 1 min. | 3 min. | 5 min. |
| On 80 mesh screen | 47 | 34 | 32 |
| On 100 mesh | 27 | 6 | 5 |
| On 150 mesh | 11 | 28 | 15 |
| On 200 mesh | 1 | 12 | 21 |
| On 325 mesh | 14 | 20 | 47 |

In making the sieve analysis the samples were wet screened and the material retained on a given screen was carefully removed and dried down to substantially zero moisture content before weighing. It is to be noted that the volume of the suspension after mixing in the single action mixer was 14.1 gallons (U.S.). Therefore, since the pumping and processing rate was approximately 12 gallons per minute, a closed circuit wet-grinding time of 1.17 minutes corresponds approximately to one-pass through the wet-grinder. 3 minutes of closed circuit wet-grinding corresponds to approximately 2.56 once through passes, and 5 minutes of closed circuit wet-grinding corresponds to approximately 4.28 passes once through the wet-grinder. It is to be noted that the combined furnish of 20# soybean flakes and 5# fertilizer blood had only 3.82% passing through a 150 mesh screen, whereas after 1 minute of closed circuit wet-grinding 15% of the material passed through a 150 mesh screen, after 3 minutes of closed circuit wet-grinding 32% passes through a 150 mesh screen, and after 5 minutes of closed circuit wet-grinding 48% passes through a 150 mesh screen.

2000 grams of the hydrated mixture (containing 400 grams of organic material) were reacted with 64 grams of 50% NaOH in the double action lab mixer of Example 1 for 2 minutes. 40 grams of hydrated lime in 60 grams of water were added and the mixture stirred 2 minutes until smooth. Then 120 grams of sodium silicate (with 29.4% total solids, and an $Na_2O/SiO_2$ ratio of 3.22) were added and the mixture was stirred for 10 minutes until smooth.

The viscosity of this adhesive mix and all following mixes were measured on the MacMichael viscosimeter using a #26 wire, with 3 cm. immersion of the 1 cm. diameter bobbin at 24 r.p.m. Values obtained on the MacMichael viscosimeter can be converted to approximate values of centipoise seconds (cp. s.) by multiplying by 20. With the adhesive mix of Example 1, the immediate viscosity was 60 on the MacMichael viscosimeter at 70° F., was 75 at ½ hour; was 100 at 2 hours; was 122 at 4 hours, and was 150 overnight. 13/16" plywood panels with ⅛" face veneers, 3/16" cross bands and 3/16" core veneer were made in the cold press no clamp process at ambient temperature, using a wet glue spread of 140# per 1000 sq. ft, double glue line, at assembly times of 5 minutes and of 21 minutes, and a pressing time of 30 minutes, under 175 p.s.i. hydraulic pressure. After removal from the press, the panels were allowed to remain undisturbed for 16 hours after which time they were examined for bond strength. The plies were difficult to separate using a chisel and hand leverage. Panels made with a 5 minute assembly time showed about 65% wood failure. Panels made with a 21 minute assembly time showed 32% wood failure. Panels at both of these assembly times passed U.S. Department of Commerce Commercial Standard CS45–55 for interior plywood. 13/16" panels of the same construction were made in the hot press method using a spread of 90# per 1000 sq. ft. of double glue line, an assembly time of 15 minutes, and a pressing time of 6 minutes with a platen temperature of 285° F. and with 175 p.s.i. hydraulic pressure. After removal from the hot press, these panels were allowed to remain undisturbed for 24 hours and then tested for bond strength. Exceptional bond strength was noted and the plies were difficult to separate by knife or chisel and showed 93% wood failure. 2" x 5" specimens were tested according to the test method in U.S. Commercial Standard CS45–55 for interior plywood and passed 100%.

Example 2

To 2292 grams of the finished adhesive of Example 1 were added 40 grams of a 58% resin solids, aqueous acetone-amine-formaldehyde resin solution prepared as follows:

To a 2000 ml. glass reaction flask equipped for reflux and cooling, were added 300 grams of acetone, 1260 grams of 37% Formalin and 252 grams of a 20% by weight solution of di-methylamine in water. The temperature of the reaction mass was controlled and allowed to rise uniformly to 180° F. over a period of 1 hour and 50 minutes. The temperature was held at 180° F. for an additional 2 hours, after which the mass was allowed to cool at a uniform rate to 117° F. over a period of 75 minutes. At this temperature, 25 grams of tri-ethylene-tetramine were added and the reaction mass heated to 195° F. in 15 minutes and held between 195° F. and 200° F. for 3 hours. The resin was then cooled to 70° F. in 15 minutes and was found to have a pH of 7.5 and a viscosity of 2.5 centipoises, and was completely water soluble. 13/16" plywood of the same construction as Example 1 was made in the no-clamp cold process using a wet spread of 140# per 1000 sq. ft. of double glue line at assembly times of 5, 13 and 18 minutes and a pressing time of 30 minutes in the cold press at a hydraulic pressure of 175 p.s.i. After removal from the press, these panels were allowed to remain undisturbed at room temperature for 16 hours. These panels were then tested for bond strength. The individual plies were difficult to separate by knifing and showed 76% wood failure. This strength is to be contrasted with Example 1, compared with which it shows a considerable gain in dry strength. All of these panels passed the commercial standard CS45–55 test for interior panels.

13/16" plywood of the same construction was made by the hot press method using a wet glue spread of 60# 1000 sq. ft. of double glue line, an assembly time of 15 minutes, and a pressing time of 6 minutes at 285° F. platen temperature and 175 p.s.i. After removal of these panels from the hot press, they were allowed to cool to room temperature over a 24 hour period before testing for bond strength.

Extremely good adhesion was noted, since the individual plies were very difficult to separate with a chisel. A wood failure of 88% was observed. All of these panels passed the CS45–55 test for interior plywood.

Example 3

To 2280 grams of the finished adhesive of Example 1, were added 40 grams of a commercial (Cascophen W-63) 40% resin solids aqueous alkaline phenol formaldehyde resin, with stirring to make a smooth mix. 13/16" plywood of the same construction as Example 2 was made by the no clamp cold press method using this adhesive with a wet glue spread of 130# per 1000 sq. ft. double glue line, assembly times of 5, 13, 19, 24 and 31 minutes, and held under a press pressure of 175 p.s.i. for 30 minutes. The panels were removed from the press and allowed to remain undisturbed at room temperature for an additional 16 hours before testing for bond strength. The individual plies were strongly resistant to separation, using a knife, and showed an average of 78% wood failure. All of these panels passed the CS-45–55 test for interior plywood.

13/16" plywood of the same construction as Example 2 was made by the hot press method using a wet spread of 70# per 1000 sq. ft. of double glue line and an assembly time of 15 minutes. The panel assemblies were pressed in a hot press having a platen temperature of 285° F. at a hydraulic pressure of 175 p.s.i. After removal from the hot press, the panels were conditioned at room temperature for 16 hours before testing the bond between the plies. The plies were exceedingly difficult to separate using a hunting knife and showed an average of 80% wood failure. All of these panels passed the CS45–55 test for interior plywood.

Example 4

| | Lb. |
|---|---|
| Whole field peas | 17.5 |
| Fertilizer blood (same as Example 1) | 7.5 |
| Water at 110° F | 100 |
| and | |
| Tri-butoxy-ethyl-phosphate | 0.75 | were slurried in the single action mixer of Example 1 and pumped at approximately 12 gallons per minute to the intake of the attrition mill of Example 1 (having the grinding plates set at substantially zero clearance). The mixture was recirculated through the mill in closed circuit grinding for 10 minutes during which time the temperature was observed to rise at 140° F.

2000 grams of the hydrated mixture (containing 400 grams of organic material) were reacted with 80 grams of 50% NaOH in the double action lab mixer of Example 1 for 3 minutes. 48 grams of hydrated lime in 60 grams of water were added and the mixture stirred 3 minutes until smooth. Then 120 grams of sodium silicate having a composition the same as in Example 1 were added and the whole mixture stirred 5 minutes until smooth.

The immediate viscosity of the adhesive mix was 100 on the MacMichael using a #26, 3 cm. immersion of the 1 cm. dia. bobbin at 24 r.p.m. at 70° F.

13/16" plywood panels were made as in Example 1 in the hot press using glue ½ hour old and at a wet spread of 100# per 1000 sq. ft. of double glue line, an assembly time of 10 minutes, and a pressing time of 5½ minutes at 275°F. and 175 p.s.i. gauge hydraulic pressure. This plywood was stacked hot on removal from the hot press and allowed to stand overnight before testing. The plywood showed a good bond with 68% wood faliure when the plies were separated with a knife. All specimens passed the U.S. Department of Commerce Commercial Standard CS45–55 test for interior grade plywood.

Example 5

To 2000 grams of the hydrated fine ground soybean and fertilizer blood of Example 1 was added 40 grams of commercial 37.5% formaldehyde solution, as a preservative. After thorough mixing there was no apparent increase in viscosity, and no odor of formaldehyde was apparent. This sample was stored in a closed bucket at room temperature along with a control of 2000 grams of the unpreserved hydrated fine ground soybean and fertilizer blood of Example 1. Mold and decay were observed on the control in 48 hours, after which time it was judged to be unfit for further processing into adhesive. The formaldehyde treated material was found to be mold free after ten days of storage. This material was then tested by being made into adhesive using the same ingredients and proportions as in Example 1. The viscosity of the finished adhesive mix was 82 on the #26 MacMichael. 13/16" plywood was made in the hot press in the same fashion as that of Example 1 using a wet glue spread of 90# per 1000 sq. ft. of double glue line, an assembly time of 15 minutes, and a pressing time of 6 minutes with a platen temperature of 285°F. and a hydraulic pressure of 175 p.s.i. gauge. The panels were knifed after ageing for 24 hours and showed 90% wood failure. All specimens were tested according to the test method in U.S. Commercial Standard CS45–55 for interior plywood and passed. This Example demonstrates that the addition of formaldehyde to a fine ground hydrated soybean fertilizer blood mix gives an adhesive precourser which is stable against microbial decomposition at ambient temperature storage for at least ten days. Similar tests with acetaldehyde and propionaldehyde, rather than formaldehyde, were equally effective.

Example 6

| | Lb. |
|---|---|
| Residue from extraction of oil from cottonseed (containing 41% protein) | 20 |
| Fertilizer grade blood | 5.0 |
| Water at 70°F | 100 |
| and | |
| Tri-butyl phosphate | 0.5 | were stirred in the single action mixer of Example 1 and pumped at approximately 12 gallons per minute to the intake of the Sprout-Waldron attrition mill of Example 1, the mill having the grinding plates thereof set at zero clearance. The mixture was recirculated for 5 minutes in closed circuit wet-grinding. The finely ground product at this stage had an appearance similar to the ground product in Example 1. 46% passed through a 150 mesh screen when wet screened.

2000 grams of the hydrated mixture (containing 400 grams of combined fertilizer grade blood and cottonseed residue) were reacted with 32 grams of solid sodium hydroxide dissolved in 32 grams of water, 40 grams of hydrated lime suspended in 100 grams of water, 120 grams of liquid sodium silicate having the same ratio as in Example 1, and 40 grams of a 40% solids content alkaline aqueous phenol formaldehyde resin solution. These finished adhesives had an immediate viscosity of 250 on the MacMichael using a #26 wire. 13/16" Douglas fir plywood panels were made in the hot press in the same manner as in Example 1, using a wet glue spread of 60# wet adhesive per 1000 square feet of double glue line, an assembly time of 15 minutes, and a pressing time of 6 minutes at 285°F. and 175 p.s.i. hydraulic pressure. After conditioning at room temperature for 24 hours the plywood panels were knifed open and showed an average of 57% wood failure. Specimens 2" x 5", tested according to the press method in U.S. Commercial Standards CS45–45 for interior plywood, passed 100%. Similar results were obtained in the cold press method, using the conditions of Example 1.

Example 7

| | Lb. |
|---|---|
| Soybean flakes, containing 44% protein | 6.25 |
| Safflower residue, containing 20% protein | 6.25 |
| Fertilizer grade blood, | 12.5 |
| Water at 70° F. | 75 |
| and | |
| Polypropylene glycol (molecular weight 4000) | 0.5 | were slurried in the single action mixer of Example 1 and pumped at approximately 12 gallons per minute through the intake of the Sprout-Waldron attrition mill of Example 1, having the grinding plates set at zero clearance. The mixture was recirculated through the mill in closed circuit grinding for 5 minutes. At the end of this grinding period the product appeared hydrated, relatively smooth, and non-settling.

2000 grams of this hydrated mix containing 500 grams of fine soybean safflower and fertilizer grade blood was treated with 40 grams of solid sodium hydroxide dissolved in 40 grams of water, 50 grams of hydrated lime suspended in 100 grams of water, and 150 grams of liquid sodium silicate having the same composition as in Example 1, were added and mixed together. The specific gravity of the adhesive at the end of the mixing period was 1.14, showing efficient defoaming was maintained. The viscosity was 5 on the MacMichael #26. 13/16" plywood was made with this adhesive in the same manner as employed in Example 1, modified to involve a wet glue spread of 60# per 1000 sq. ft. of double glue line, an assembly time of 21 minutes, a pressing time of 6 minutes at 285° F. and a pressure of 175 p.s.i. gauge. After 24 hours of conditioning at room temperature the panels were examained by attempting to separate the plies with a knife. An average of 80% wood failure was observed. 2000 grams of dehydrated mix containing 500 grams of organic material were treated with 27 grams of commercial Formalin (37% formaldehyde) and allowed to stand for 64 hours at 70° F. before treating further in the glue making process. No evidence of microbial decomposition was observed during this time. Decomposition is readily observed in untreated samples due to the rapid development of foul odor and loss of viscosity. At the end of the 64 hour period a glue was made up following the same manner of mixing and quantities of chemicals as in the earlier glue in this example. The viscosity of this glue was 74 on a MacMichael #26. 13/16" plywood was made in the same fashion as previously, except that a 15 minute assembly time was used. This plywood showed an average of 70% wood failure when subjected to the knife test. All panels of both glues were cut into 2" x 5" specimens, tested according to the test method of U.S. Commercial Standard CS45–45 for interior plywood, and passed 100%. Similar results were obtained in cold press tests using a wet glue spread of 140# to 1000 sq. ft. of double glue line with assembly times varying from 5 minutes to 29 minutes.

Throughout this specification and claims, when I refer to the no-clamp process for making plywood, I mean that the unpressed plywood assembly is placed in a hydraulic press and gluing pressure applied (usually at from 125 p.s.i. to 250 p.s.i. for a limited time (from about 10 minutes to about 60 minutes), during which time a preliminary bond is obtained of sufficient strength to enable the pressed plywood assembly to be removed from the hydraulic press and stacked in the absence of any external clamps for such additional room temperature curing time as is necessary to develop full bond strength. Such additional curing time is usually from about 4 hours to 24 hours, in conventional practice.

While I prefer to effect the hydration and particle size reduction of the fertilizer blood and seed stock in the presence of water and defoamer materials alone, under some circumstances it is advantageous to combine the alkali metal hydroxide with the water and organic material in a pre-soak treatment at room temperature or higher prior to the hydro-pulping step. Alkali-metal salts may also be included in this step. Usually the alkaline earth hydroxides are not included with the alkali metal hydroxides under these circumstances.

In practicing my invention it is possible to prepare adhesives having significantly different qualities, and making such economically by varying the ratio of fertilizer grade blood to the carrier medium made from oil seed residue (or equivalent whole undecorticated legume seeds or safflower seeds). The inclusion of substantial fertilizer grade blood is important to impart to the adhesive an increased resistance to weathering and resistance to decomposition by micro-organisms. Generally speaking, fertilizer grade blood is effective in the percentage range from about 10 to about 60% of the total weight of organic materials present. Below about 10% insufficient fertilizer grade blood is present to produce any significant change in adhesive property, while above 60% of the ability of the blood to undergo simultaneous hydration and size reduction becomes increasingly difficult. It is to be understood that the upper limit as to blood content is determined solely by the ability of the blood-seed combination to be finely ground in the wet-grinding process. Inorganic chemical reactants may be varied within the following approximate limits expressed in pounds of dry chemical per 100# of dry protein containing glue base; hydrated lime or equivalent approximately 5# to approximately 30#; sodium hydroxide or equivalent, approximately 5# to approximately 15#; sodium silicate or equivalent, approximately 10# to approximately 50#; water soluble phenol aldehyde condensation product or equivalent (when present), approximately 2# to approximately 20#; and aldehyde preservative (expressed 37½% solution), approximately 5# to approximately 10# (when present).

What is claimed is:

1. The process comprising:
   (a) mixing unground, water insoluble, fertilizer grade blood and unground seed stock in water to form an aqueous slurry, said seed stock being selected from the group consisting of oil-seed residues, undecorticated legume seeds, safflower seeds, and mixtures thereof;
   (b) grinding said aqueous slurry in a wet-mechanical grinder to effect hydration and reduction in particle size of the mixture; and
   (c) collecting the hydrated, finely ground product.

2. The process of forming an adhesive, comprising chemically reacting the organic product formed by the process of claim 1 with an inorganic reactant selected from the group consisting of alkali metal hydroxides, alkaline earth hydroxides, alkali metal salts capable of undergoing double decomposition reaction with an alkaline earth hydroxide, and mixtures thereof.

3. The process of claim 2, wherein the fertilizer grade blood is present in the amount of from about 10% to about 60% of the total weight of organic materials present, the alkaline earth hydroxide when present is in the amount of about 5 parts to about 30 parts, the alkali metal hydroxide when present is in the amount of about 5 parts to about 15 parts, and the alkali metal salt when present is in the amount of from about 10 parts to about 50 parts, per 100 parts by weight of organic material present.

4. The process of claim 2, wherein said alkaline earth metal hydroxide is calcium hydroxide, said alkali metal hydroxide is sodium hydroxide, and said alkali metal salt is sodium silicate.

5. The process of claim 2, further comprising mixing with the finely ground organic product and the inorganic reactant, a resin selected from the group consisting of acetone-aldehyde resin and phenol-aldehyde resin.

6. The process comprising:
   (a) forming a water slurry of unground, water insoluble, fertilizer grade blood, and unground seed stock, said seed stock being selected from the group consisting of oil-seed residues, undecorticated legume seeds, safflower seeds, and mixtures thereof;
   (b) including a defoamer in such water slurry;
   (c) grinding the resulting slurry in a wet mechanical grinder to effect hydration and reduction in particle size of the mixture; and
   (d) collecting the hydrated, finely ground product.

7. The process of claim 6, further comprising adding an aldehyde preservative to the hydrated, finely divided product.

8. The process of forming an adhesive, comprising chemically reacting the organic product formed by the process of claim 6 with an inorganic reactant selected from the group consisting of alkali metal hydroxides, alkaline earth hydroxides, alkali metal salts capable of undergoing double decomposition reaction with an alkaline earth hydroxide, and mixtures thereof.

9. The process of claim 8, wherein the fertilizer grade blood is present in the amount from about 10% to about 60% of the total weight of organic materials present, the defoamer is present in an amount at least about 1%, based on the total weight of the organic materials present, the alkaline earth hydroxide when present is in the amount of about 5 parts to about 30 parts, the alkali metal hydroxide when present is in the amount of about 5 parts to about 15 parts, and the alkali metal salt when present is in the amount of from about 10 parts to about 50 parts, per 100 parts by weight of organic material present.

10. The process of claim 6, wherein said defoamer is water insoluble.

11. The process of claim 8, wherein said alkaline earth metal hydroxide is calcium hydroxide, said alkali metal hydroxide is sodium hydroxide, and said alkali metal salt is sodium silicate.

12. The process of claim 8, further comprising mixing with the finely ground organic product and the inorganic reactants, a resin selected from the group consisting of acetone-aldehyde resin and phenol-aldehyde resin.

13. The process comprising:
   (a) forming a blood-seed water slurry of a substantially unground, water insoluble fertilizer grade blood of a particle size having at least 55% retained on #60 mesh screen, together with a proteinaceous material selected from the group consisting of undecorticated oil and legume seeds, oil-seed residues, and mixtures thereof, said seed stock having a particle size retained at least 87% on #60 mesh screen;
   (b) mixing with such blood-seed slurry a water insoluble defoaming agent;
   (c) wet grinding the resulting mixture to effect hydration and reduction in particle size of the mixture; and
   (d) recovering the resulting hydrated, finely ground product for use as an adhesive upon reaction with inorganic, alkaline reactants.

14. The process of forming an adhesive, comprising chemically reacting the organic product formed by the process of claim 13 with an inorganic reactant selected from the group consisting of alkali metal hydroxides, alkaline earth hydroxides, alkali metal salts capable of undergoing double decomposition reaction with an alkaline earth hydroxide, and mixtures thereof.

15. The process of claim 14, wherein the fertilizer grade blood is present in the amount of from about 10% to about 60% of the total weight of organic materials present, the defoamer is present in an amount at least about 1%, based on the total weight of the organic materials present, the alkaline earth hydroxide when present is in the amount of about 5 parts to about 30 parts, the alkali metal hydroxide when present is in the amount of about 5 parts to about 15 parts, and the alkali metal salt when present is in the amount of from about 10 parts to about 50 parts, per 100 parts by weight of organic material present.

16. The hydrated, finely ground product formed by the process of claim 1.

17. The adhesive product formed by the process of claim 3.

18. The adhesive product formed by the process of claim 5.

19. The hydrated, finely ground product formed by the process of claim 6.

20. The adhesive product formed by the process of claim 9.

21. The adhesive product formed by the process of claim 12.

22. The adhesive product formed by the process of claim 15.

References Cited

UNITED STATES PATENTS

| | | | |
|---|---|---|---|
| 1,680,264 | 8/1928 | Johnson | 106—154 |
| 3,056,687 | 10/1962 | Stephan | 106—154 |
| 3,095,571 | 6/1963 | Cone | 106—124 |

JULIUS FROME, *Primary Examiner*

T. MORRIS, *Assistant Examiner.*

U.S. Cl. X.R.

260—7, 123.5